United States Patent
Vogel et al.

(10) Patent No.: US 8,475,549 B2
(45) Date of Patent: Jul. 2, 2013

(54) PROCESS FOR GENERATING METHANE AND/OR METHANE HYDRATE FROM BIOMASS

(75) Inventors: Frederic Vogel, Erlinsbach (CH); Samuel Stucki, Nussbaumen (CH); Thanh-Binh Truong, Buchs (CH); Maurice H. Waldner, Baden (CH)

(73) Assignee: Paul Scherrer Institut, Villigen/PSI (CH)

( * ) Notice: Subject to any disclaimer, the term of this patent is extended or adjusted under 35 U.S.C. 154(b) by 1495 days.

(21) Appl. No.: 11/992,812

(22) PCT Filed: Jun. 19, 2006

(86) PCT No.: PCT/EP2006/005837
§ 371 (c)(1),
(2), (4) Date: Mar. 27, 2008

(87) PCT Pub. No.: WO2007/038996
PCT Pub. Date: Apr. 12, 2007

(65) Prior Publication Data
US 2009/0126274 A1    May 21, 2009

(30) Foreign Application Priority Data
Oct. 4, 2005  (EP) ..................................... 05021601

(51) Int. Cl.
*C10L 3/08*   (2006.01)
(52) U.S. Cl.
USPC ........................................ 48/127.5; 48/127.7

(58) Field of Classification Search
USPC ............ 48/127.1, 127.3, 127.5, 127.7; 423/1, 423/34, 42, 50, 55, 65, 85, 93, 101, 102, 423/123, 141, 159, 195; 585/240, 648; 95/50
See application file for complete search history.

(56) References Cited

U.S. PATENT DOCUMENTS 3,514,274 A  * 5/1970  Johnston et al. ................. 585/15
4,113,446 A    9/1978  Modell et al.
(Continued)

FOREIGN PATENT DOCUMENTS

| DE | 31 33 670 A1 | 3/1983 |
| DE | 196 34 111 A1 | 2/1998 |

(Continued)

OTHER PUBLICATIONS

Derwent Abstract—DE 196 34 111 A1; Feb. 26, 1998; Ernst Eisenmann, D-81477 Muenchen, Germany.

(Continued)

*Primary Examiner* — Wayne Langel
*Assistant Examiner* — Syed Iqbal
(74) *Attorney, Agent, or Firm* — Laurence A. Greenberg; Werner H. Stemer; Ralph E. Locher

(57) ABSTRACT

To generate methane from biomass, a biomass pulp is produced from the biomass with a desired dry mass content being set, and the biomass pulp is placed under pressure. The biomass pulp is heated under pressure in order to liquefy the solid organic components of the biomass pulp. The pressurized and heated biomass pulp is heated further to at least the critical temperature of the biomass pulp. Solids precipitated under pressure and increased temperature are separated from the fluid phase. At least a part of the remaining fluid phase is gasified under pressure and increased temperature by means of a reactor to form a methane-rich gas.

14 Claims, 2 Drawing Sheets

U.S. PATENT DOCUMENTS

| | | | | |
|---|---|---|---|---|
| 4,211,540 A | * | 7/1980 | Netzer | 48/202 |
| 5,171,592 A | * | 12/1992 | Holtzapple et al. | 426/69 |
| 5,630,854 A | * | 5/1997 | Sealock et al. | 48/127.7 |

FOREIGN PATENT DOCUMENTS

| | | |
|---|---|---|
| EP | 1 002 767 A2 | 5/2000 |
| EP | 1 632 550 A | 3/2006 |
| JP | 2001115174 A | 4/2001 |
| JP | 2003311141 A | 11/2003 |
| JP | 2005187632 A | 7/2005 |
| WO | WO 96/30464 A | 10/1996 |

OTHER PUBLICATIONS

Derwent Abstract—EP 1 632 550 A1; Mar. 8, 2006; Forschungszentrum Karlsruhe GmbH, D-76133 Karlsruhe, Germany.

Derwent Abstract—DE 31 33 670 A1; Mar. 17, 1983; Kraftwerk Union AG, D-4330 Mülheim, Germany.

* cited by examiner

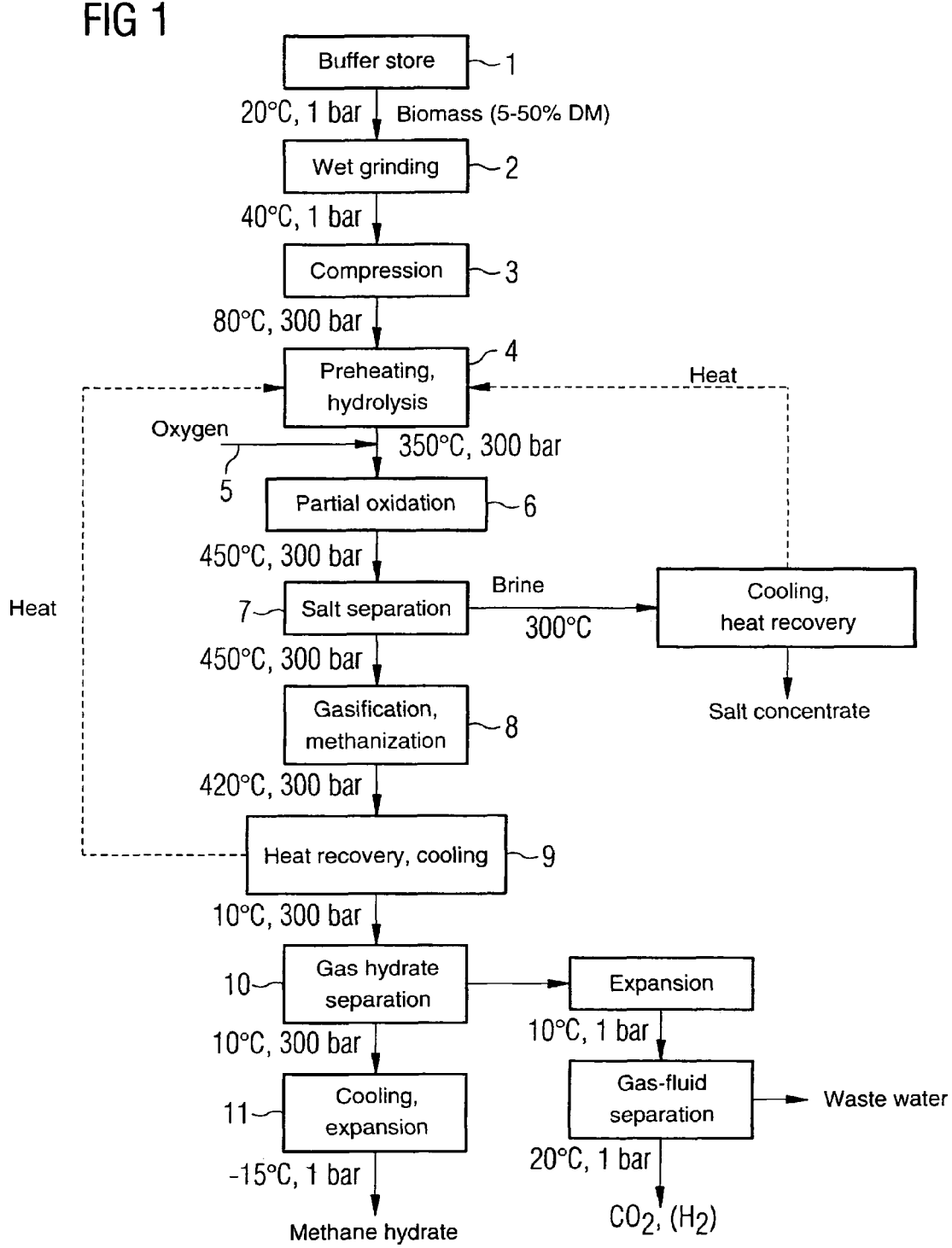

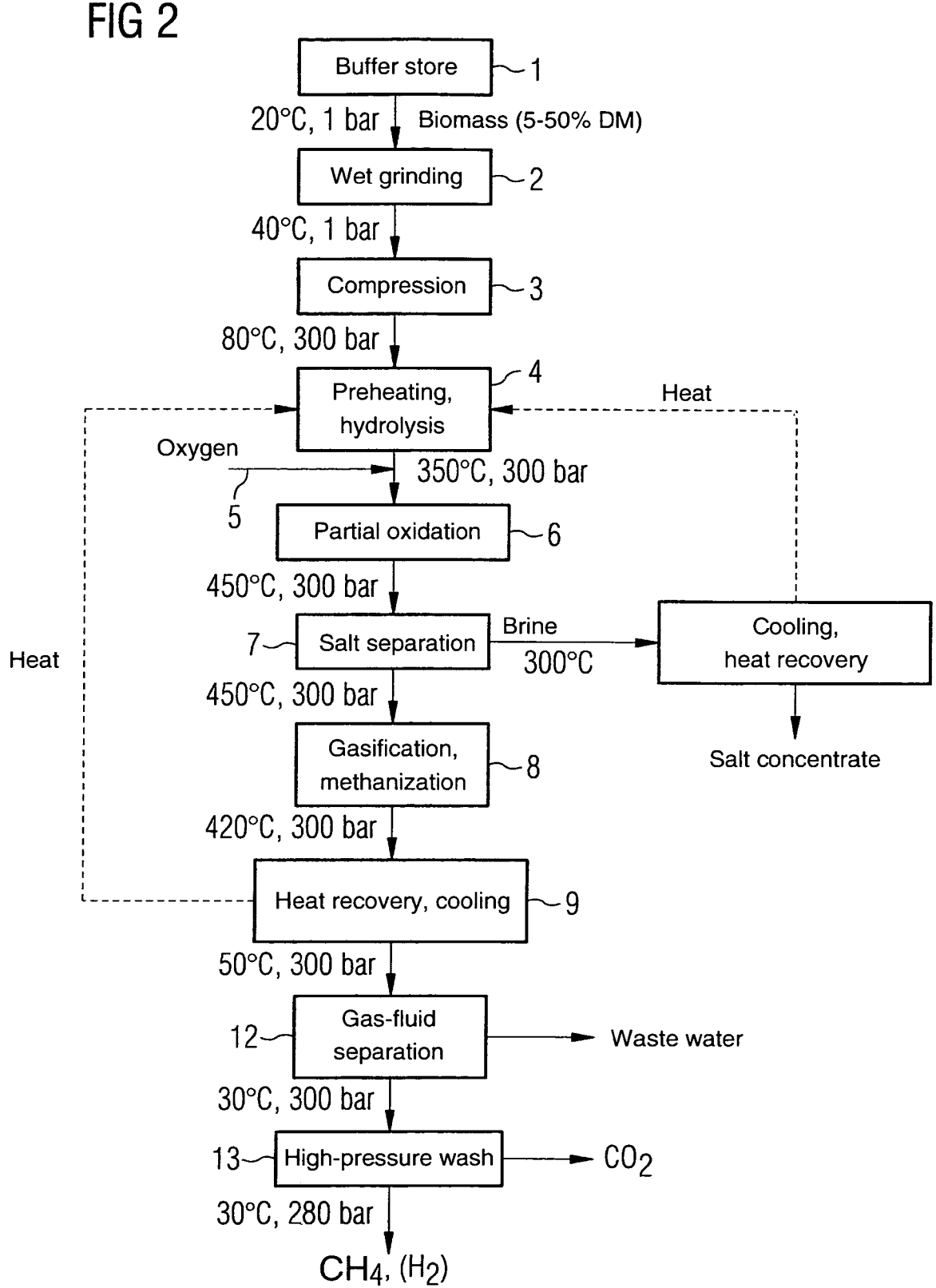

PROCESS FOR GENERATING METHANE AND/OR METHANE HYDRATE FROM BIOMASS

CROSS-REFERENCE TO RELATED APPLICATIONS

The present application is a national stage application of International Application No. PCT/EP2006/005837, filed on Jun. 19, 2006, which claims priority to European Patent Application No. 05021601.9, filed on Oct. 4, 2005, both of which are incorporated herein by reference.

BACKGROUND OF THE INVENTION

The present invention relates to a method for generating methane and/or methane hydrate from biomass.

The term "biomass" is understood as meaning plant or animal material. Wood, manure, slurry, straw, grass, algae, sewage sludge and abattoir waste may be cited by way of example.

However, the method should also be suitable for other materials having organic content such as: plastic waste, effluents, refuse, used tires, waste paper, waste oils, organic solvents, fossil biomass (peat, coal, mineral oil).

Attention is drawn to the huge, largely unused energetic potential of slurry in a study recently commissioned by the Swiss Federal Energy Agency (BFE, Switzerland) from Wädenswil University, Scheurer, K.; Baier, U.: "Biogene Güter in der Schweiz. Massen und Energieflüsse" ("*Biogenic materials in Switzerland. Volumes and energy flows*"), University of Wädenswil, commissioned by the BFE, Biomass Program, Final Report, February 2001. In 1998/99, the entire yield of farmyard manure (dung+slurry) amounted to 2,283 million t DS (dry substance), which is equivalent to an energy content of 37 PJ. In 1998, the fermentation of 4'700 t DS farmyard manure yielded around 48 TJ of energy in the form of biogas, which represents only approx. 0.1% of the entire energy potential in farmyard manure. Moreover, during the fermentation relatively large volumes of non-fermentable solid matter are produced. Woody biomass can practically not be fermented.

In the following description the term "hydrothermal" refers to an aqueous system under pressure and increased temperature, typically near to or above the critical point of water (374° C., 221 bar). Near-critical and supercritical water forms an interesting reaction medium for producing chemical reactions. This medium is suitable in particular for the hydrolysis and conversion of biomass into liquid and gaseous products. Since the transition of a liquid system under pressure into the supercritical range does not constitute a true phase transition, no evaporation enthalpy has to be used for the water contained in the biomass, which is in contrast to gas phase processes (e.g. atmospheric, gasification of wet biomass). Consequently hydrothermal processes have the potential for high levels of thermal efficiency.

The most preferred reaction for the conversion of biomass into methane can be described by way of example for wood with the following stoichiometry:

$$CH_{1.52}O_{0.64}(s) + 0.3H_2O(g) \rightarrow 0.53CH_4(g) + 0.47CO_2(g) \quad (1)$$

Under normal conditions (low water partial pressure) the conversion of biomass with water does not, or not completely, proceed according to Equ. (1), but instead byproducts are produced such as e.g. tars or solid carbon (coke). If the reaction conditions are successfully chosen such that reaction (1) takes place completely, a high level of thermal efficiency can be expected since the reaction (1) is slightly exothermal. The theoretically maximum possible efficiency is 95% (referred to the net calorific value $H_u$ of wood). A system analysis performed by the applicant for a commercial process produced an achievable level of efficiency in the range of 70-80% for wood. This has been described in detail in the literature reference "Vogel, F., and F. Hildebrand, Catalytic Hydrothermal Gasification of Woody Biomass at High Feed Concentrations. *Chem. Eng. Trans.* 2, 2002, 771-777". This is significantly higher than the efficiency of other methods for converting wood into methane.

To sum up, in terms of the achievable efficiencies, however, the currently known processes for generating methane from biomass fall short of the theoretical expectations, with the result that they cannot be utilized economically at the present time.

SUMMARY OF THE INVENTION

The object underlying the present invention is therefore to disclose a method for generating methane from biomass wherein a high level of efficiency which would satisfy the requirements for economically viable use can be achieved under hydrothermal conditions.

The method according to the invention for generating methane from biomass comprises the following method steps:

a) a biomass pulp is produced from the biomass with an optimal dry mass content being set, b) the biomass pulp is placed under pressure, c) the biomass pulp is heated under pressure in order to liquefy the solid organic components of the biomass pulp, d) the biomass pulp pressurized and heated in this way is heated further up to at least the critical temperature appropriate to the mixture, e) solids precipitated under pressure and increased temperature are separated from the fluid phase, and f) at least a part of the fluid phase is gasified under pressure and increased temperature by means of a catalytic reactor to form a methane-rich gas.

In this way a method is created which has a very high level of efficiency because a major portion of the substances disrupting the catalytic gasification, in particular salts, can be separated from the mixture by precipitation under supercritical conditions. In this way a high methane yield and a high reaction rate can be achieved for the catalytic gasification at the same time as a long service life for the catalyst.

In a first development of the invention the pressurized methane-rich gas can be separated from the remaining fluid phase following the catalytic gasification. A subsequent cooling down of the pressurized methane-rich gas leads to a formation of solid methane hydrate which can then be separated from the remaining gas components, in particular $CO_2$ and/or carbon monoxide and hydrogen. In this case the methane hydrate thus produced has an approximate composition of $8\ CH_4 \times 46H_2O$. This means that the methane can be easily and cost-effectively stored and transported at approx. $-15°$ C. and 1 bar in the form of solid matter. Since methane preferably stores itself in a hydrate grid, the process step can advantageously also be used to separate methane from $CO_2$ and from residual gas components such as carbon monoxide, hydrogen or higher hydrocarbons. In order to obtain the methane as a pure gas, the methane hydrate can be heated, thus leading to $CH_4$ and $H_2O$ on account of its decomposition.

In a second development of the invention the methane gas generated from the pressurized methane-rich gas during the catalytic gasification can be separated, preferably using the pressure, by means of a washing column, membrane separation or adsorber method from other gas components, in particular $CO_2$ and/or carbon monoxide and/or hydrogen. In this method step the methane can be separated in a suitable apparatus (e.g. washing column, membrane separation, adsorber) from the other components, preferably $CO_2$ and carbon monoxide, from the gas phase and is then available under high pressure (200-400 bar). This advantageously removes the need for a compression step in order to transfer the methane e.g. into gas cylinders, provide it as a fuel at a filling station for gaseous fuels, or feed it into the natural gas grid. It is also conceivable to use the compressed gas directly as a fuel in a gas turbine process.

This can result in the following additional advantages:

i) in method step a) the biomass can preferably be conditioned by wet grinding while setting a desired dry mass content; in this case the dry mass content can be set inter alia by supplying or draining away water between 5 and 50 mass percent, preferably approximately in the range from 15 to 30 mass percent;

ii) other additives, such as e.g. starch or used oils, can be added to the biomass in order to improve pumpability;

iii) in method step b) the conditioned biomass pulp is brought to high pressure in the range from 200 to 400 bar and in this case can be conveyed continuously or in batches, depending on procedure; regular extruders, high-pressure eccentric screw pumps, piston diaphragm pumps and/or solid matter pumps can be used for this; the biomass pulp is then heated under pressure to approx. 200 to 350° C. so that the solid organic components of the biomass pulp are largely liquefied;

iv) for better heating and liquefaction in accordance with the advantage according to step iii), static mixed elements and/or a catalyst such as e.g. potassium carbonate, sodium carbonate, potassium hydroxide, sodium hydroxide or zinc oxide can also be used; the adding of acids (e.g. sulfuric acid) in order to improve liquefaction is also conceivable.

v) in method step d) the temperature advantageously exceeds the critical temperature of the respective mixture, which for pure water, for example, amounts to 374° C. at 221 bar; as a result of exceeding the critical point of the mixture a substantial decrease in the solubility of salts and other inorganic substances is achieved.

vi) At the same time this higher temperature level can preferably be achieved as follows:
  by means of an external heat input, e.g. via heat exchangers having a burner/catalytic burner which is fed with recycled product gas, or
  by adding of suitable oxidizing agents to the cold or partially heated biomass pulp, such as e.g. oxygen, air, hydrogen peroxide, ammonium and other nitrates, such that a partial oxidation of the organic components of the biomass pulp takes place; these oxidation reactions are exothermal and preferably generate sufficient heat to bring the biomass pulp to the desired temperature.
  by combinations of the first two methods.

vii) the collected precipitations, in particular of most of the salts, as well as the remaining solid matter can be effectively removed from the process continuously or periodically.

viii) solid matter, such as precisely the aforementioned salts, are precipitated, separated and recovered under supercritical conditions before the catalytic gasification in the reactor used; the salts rich in the elements N, P and K are exceptionally suitable for example as a basis for producing fertilizers which can be used in agriculture; in this way the ecological material loop would be closed in this respect also.

ix) in the catalytic gasification the reactor is charged with a catalyst in such a way that a gasification takes place mainly into carbon dioxide, methane, and hydrogen; in this case traces of carbon monoxide as well as higher hydrocarbons such as ethane and propane can be formed.

The catalyst preferably has a high nickel content, such as e.g. Raney® nickel, with proportions of one or more of the elements ruthenium, molybdenum, chrome and/or copper.

x) the reactor is preferably embodied as a fluidized-bed reactor, as a monolithic reactor, as a wall reactor or as a tube reactor, with associated tubes or tube nests being coated with the catalyst; alternatively the tubes of the reactor can also be filled with catalytically coated metal plates; solid-bed reactors are also conceivable, but less advantageous as a consequence of the higher risk of blockage.

BRIEF DESCRIPTION OF THE SEVERAL VIEWS OF THE DRAWINGS

The invention is explained in more detail below with reference to the drawing for the gasification of biomass (e.g. wood or slurry solid), in which:

FIG. 1 shows a basic flow diagram for the catalytic hydrothermal gasification of biomass according to a first embodiment of the invention, and FIG. 2 shows a basic flow diagram for the catalytic hydrothermal gasification of biomass according to a second embodiment of the invention.

DETAILED DESCRIPTION OF THE INVENTION

FIG. 1 shows a basic flow diagram of the catalytic hydrothermal gasification of biomass. In this case an autothermal mode of operation is possible through addition of oxygen or an allothermal variant (without addition of oxygen, with external heat input). The overheating to temperatures of 400° C. to 500° C. is implemented in the case of the last-mentioned option by the combusting of a part of the product gas and by indirect heat exchange.

The following process steps are executed below:

Step 1 Forming of a buffer for receiving the biomass while a DM content of 5 to 50 mass percent (DM=dry mass) at approx. 20° C. and 1 bar, Step 2 Wet grinding of the mixture at 40° C. and 1 bar, Step 3 Compressing of the wet-ground mixture at 80° C. and 300 bar, Step 4 Preheating (hydrolysis) at 300° C. and 300 bar, Step 5 Optional adding of oxygen (or another oxidizing agent), Step 6 Performing of a partial oxidation at a supercritical temperature of the mixture at in the present case approx. 450° C. and 300 bar, Step 7 Performing of a salt separation, cooling and discharge of brine at approx. 300° C., which results in a comparatively clean salt concentrate, with the waste heat being able to be recycled to the previous preheating step (Step 4) for the purpose of heat recovery, Step 8 Gasification and methanization to form the actual methane-rich product gas at approx. 420° C. and approx. 300 bar, Step 9 Cooling-down of the now methane-rich gas mixture to approx. 10° C. and still approx. 300 bar, with a large part of the waste heat generated in this step being able to be recycled in this case also into the preceding preheating step (Step 4), Step 10 Deposition and separation of the solid gas hydrate from the remaining gas and fluid phase under pressure at approx. 10° C. and 300 bar. Expansion of the remaining gas and fluid phase to 1 bar and separation of the gas from the fluid phase.

Step 11 Recovery of the solid methane hydrate by further cooling-down to approx. −15° C. and further expansion to ambient pressure.

The following method steps are necessary in addition for the exemplary embodiment according to FIG. 2:

Step 9 Cooling-down of the now methane-rich gas mixture to approx. 50° C. and still approx. 300 bar, with a large part of the waste heat generated in this step being able to be recycled in this case also into the preceding preheating step (Step 4), Step 12 Performing of a gas-fluid separation at 50° C. and approx. 300 bar, in which largely clean water is recovered, and Step 13 Gas separation e.g. by means of a high-pressure wash at approx. 30° C. and 280 bar, in which the methane $CH_4$ is separated from the further gas components, such as for example $CO_2$ and hydrogen, and collected.

In this overall process, therefore, a solid methane hydrate is generated from biomass having a DM content of 5 to 50 mass percent (DM=dry mass). Initially the biomass is wet-ground and conveyed to a reactor at approx. 300 bar by means of a sludge pump. In the process the suspension is preheated to approx. 300° C., leading to the hydrolysis and splitting of the biopolymers (cellulose, lignin, proteins). Before the actual catalytic gasification and methanization a stream of oxygen (or another oxidizing agent) is supplied. As a result a partial oxidation of the organic components takes place, liberating sufficient heat to reach the desired reaction temperature of 400-500° C. (autothermal mode of operation). When the supercritical region is entered (approx. 402° C. at 300 bar for pure water) most of the salts are precipitated as solids. This allows a separation of the salts to be achieved before the catalyst bed. After the hydrolyzed biomass components have been catalytically reformed into $CH_4$, $CO_2$ and the byproduct $H_2$ the water-gas mixture is cooled under pressure and some of the liberated heat is used for preheating the not yet gasified substances. The cooling temperature of approx. 10° C. at 300 bar is chosen such that the methane hydrate formation takes place, but the remaining water is not frozen. The solid methane hydrate can be separated from the remaining fluid and gas phase in a separator. In order to recover the methane hydrate, which is metastable at ambient pressure, this must be cooled down prior to expansion to at least approx. −15° C. The methane hydrate was preferably separated beforehand from residual retained water.

The method shown in FIG. 2 differs from the method shown in FIG. 1 only as of method step 9. The cooling-down takes place only to a temperature of 25-50° C. In this range no methane hydrate is produced, but instead the gases are present in dissolved form in the aqueous phase. Instead of the forming of solid methane hydrate, provision is made in step 12 for the separation of fluid and gaseous phase using the high pressure of still approx: 300 bar, and in the following step 13 for the separation of carbon dioxide in a high-pressure washer. By this means in this method the methane is present as a gaseous gas under high pressure.

It is also possible, instead of step 13, to expand the gas and separate it using known separation methods (pressure swing adsorption, gas washing) into $CH_4/H_2$ and $CO_2$. Then, however, the methane gas is not available under high pressure.

Owing to this procedure a whole series of advantages is achieved by means of the methods according to the invention over the prior art:

The conversion of the biomass takes place in and by means of water. Damp or wet biomass does not need to be dried. This enables a higher level of energetic efficiency of the method to be achieved.

The biomass is conditioned in a 1st process stage, i.e. comminuted and brought to the desired dry mass (DM) content, preferably by wet grinding. This results in a pumpable pulp. Other additives (e.g. starch, used oils) can be added to the biomass in order to improve pumpability. The desired dry mass content amounts to 5 to 80 mass percent, preferably approx. 15 to 40 mass percent. The method operates particularly economically when the organic dry mass content amounts to approx. 20 mass percent and more.

In a 2nd process stage the conditioned biomass pulp is brought to high pressure (200-400 bar) and conveyed either continuously or in batches. Extruders, high-pressure screw pumps, piston diaphragm pumps, and solid matter pumps are particularly suitable as conveying units.

In a 3rd process stage the biomass pulp is heated under pressure to 200-350° C. In the process the solid organic biomass components are largely liquefied. To assist better heating and liquefaction, this process stage can include static mixed elements and/or a catalyst (e.g. zinc oxide).

In a 4th process stage the pressurized, heated and liquefied biomass pulp is brought quickly to an even higher temperature level, preferably in the range of or above the critical temperature of the respective mixture, in a suitable apparatus (e.g. cyclone, MODAR separator, filter). The critical temperature of water at 374° C. and 221 bar serves here as a point of reference. This can be effected through external heat input (e.g. by means of a burner/catalytic burner that is fed with recycled product gas) or by addition of suitable oxidizing agents (e.g. oxygen, air, hydrogen peroxide, ammonium and other nitrates) directly into the $4^{th}$ process stage (or one of the preceding process stages 1-3). This causes most of the salts and residual solids to precipitate so they can be collected. As a variant, the collected precipitations are removed continuously or periodically from the process. The separation and recovery of solid substances from salts before the catalytic gasification reactor under hydrothermal conditions as well as the possible addition of saline oxidizing agents (nitrates, e.g. ammonium nitrate) for partial oxidation of the biomass under hydrothermal conditions improve the performance and increase the efficiency of the method substantially. Owing to the nature of the original substances the removed solids are extremely rich in nitrogen, phosphorus and potassium salts and consequently are exceptionally well suited to further use as fertilizers for agriculture.

In a 5th process stage the hot biomass stream, now freed from most of the solids, reaches a reactor charged with a suitable catalyst, where the gasification into methane, carbon dioxide, hydrogen and traces of carbon monoxide as well as higher hydrocarbons (ethane, propane) takes place. In this case the catalyst preferably has a high nickel content (e.g. Raney® nickel) and may furthermore also include proportions of ruthenium, chrome and/or copper. Other catalysts based on Ni, Ru, or Rh as the active metal can also be used. The reactor is preferably embodied as a fluidized-bed reactor, as a monolithic reactor or as a wall reactor (with catalyst-coated tube or tube nest). Alternatively it would also be possible to use tubes into which catalytically coated metal plates are inserted.

In a 6th process stage (A) the product stream is cooled down under pressure (200 to 400 bar) to approx. 50° C. in accordance with the first flow diagram described in the foregoing and aftercooled in a suitable apparatus to 0 to 20° C. In the process solid methane clathrate hydrate (or methane hydrate) forms. This white solid has an approximate composition of $8\ CH_4 \times 46H_2O$. This enables methane to be cost-effectively transported as a solid at approx. −15° C. and 1 atm. This process step can also be used to separate methane from the $CO_2$ and the remaining gas components.

The production of methane hydrate from biomass thus described and the forming of methane hydrate in order to simplify the separation of the methane have a high level of efficiency.

Alternatively to the above-described 6th process stage (A), it is possible according to the second flow diagram described in the foregoing to choose a 6th process stage (B) in which the product stream is cooled to approx. 50° C. and the gas phase is separated from the fluid phase under pressure. The methane can be separated from the other components from the gas phase in a suitable apparatus (e.g. washing column, membrane separation, adsorber) and is then available under high pressure (approx. 200 to 400 bar). This removes the need for a compression step in order to transfer the methane into gas cylinders, to provide it as fuel at a filling station for gaseous fuel or feed it into the natural gas grid. It is also conceivable to use the compressed gas directly as a fuel in a gas turbine process.

Accordingly the providing of methane from biomass under a pressure suitable for natural gas refueling stations and/or for feeding into the natural gas grid, for transferring into cylinders, or for use as a fuel in gas turbines according to this second method affords a substantial economic usability.

The invention claimed is:

1. A method for generating methane from biomass comprising:
    producing a biomass pulp from the biomass with a desired dry mass content being set,
    placing the biomass pulp under pressure,
    heating the biomass pulp under pressure in order to liquefy the solid organic components of the biomass pulp,
    further heating the pressurized and heated biomass pulp to at least a critical temperature appropriate to the biomass pulp, wherein a higher temperature level obtained by said further heating the biomass pulp lies at least at the critical temperature,
    separating solids precipitated under pressure and increased temperature from the fluid phase, wherein said separating includes precipitating and collecting salts and residual solids, said collected precipitations being removed from the process continuously or periodically prior to a gasification, and
    gasifying at least a part of the remaining fluid phase under pressure and increased temperature by means of a reactor to form a methane-rich gas.

2. The method of claim 1, wherein the pressurized methane-rich gas is separated from the remaining fluid phase.

3. The method of claim 1, wherein the methane-rich gas is cooled down under pressure and solid methane hydrate forming during this process is separated from the remaining gas components, in particular $CO_2$ and/or carbon monoxide and hydrogen, as well as preferably from the residual water.

4. The method of claim 3, wherein the methane generated during the gasification from the pressurized methane-rich gas, using pressure, by means of a washing column, membrane separation or adsorber method, is separated from remaining gas components, wherein said pas components include $C0_2$ and/or carbon monoxide and/or hydrogen.

5. The method of claim 1, wherein producing the biomass includes comminuting the biomass by wet grinding and setting, by supplying water or separating water to a dry mass content between 5 to 80 mass percent.

6. The method of claim 5, wherein additives are added to improve pumpability of the biomass pulp.

7. The method of claim 1, wherein placing the biomass pulp under pressure includes bringing the biomass to a pressure in the range from 200 to 400 bar.

8. The method of claim 7, wherein the biomass pulp is heated under pressure to 200 to 400° C.

9. The method of claim 8, wherein static mixed elements, a catalyst, or both is used to assist better heating and liquefaction.

10. The method of claim 1, wherein the higher temperature level is reached by means of:
    an external heat input, or
    adding of suitable oxidizing agents such that a partial oxidation of organic components of the biomass pulp takes place.

11. The method of claim 1, wherein a catalyst is used to expedite setting of a desired product gas composition.

12. The method of claim 11, wherein the catalyst contains nickel, ruthenium or rhodium as an active metal.

13. The method of claim 1, wherein a catalytic reactor is embodied as a fluidized-bed reactor, as a monolithic reactor, a wall reactor and a tube reactor, with associated tubes being coated with the catalyst or catalytically coated metal plates layered in a tube being used.

14. The method of claim 1, wherein catalytic gasification is executed under supercritical conditions.

* * * * *